US005730533A

United States Patent [19]
Noy et al.

[11] Patent Number: 5,730,533
[45] Date of Patent: Mar. 24, 1998

[54] APPARATUS AND METHOD FOR DUPLEX PRINTING

[75] Inventors: Amir Noy, Herzlia; Avi Feinschmidt, Ramat Gan, both of Israel

[73] Assignee: Nur Advanced Technologies Ltd., Kiriat Arie, Israel

[21] Appl. No.: 551,060

[22] Filed: Oct. 31, 1995

[30] Foreign Application Priority Data

| Nov. 2, 1994 | [IL] | Israel | 111514 |
| Oct. 19, 1995 | [IL] | Israel | 115699 |

[51] Int. Cl.⁶ ........................ B41J 5/00
[52] U.S. Cl. .............. 400/104; 400/708; 400/105; 358/296
[58] Field of Search .............. 400/73, 82, 104, 400/105, 706, 703, 708; 358/296

[56] References Cited

U.S. PATENT DOCUMENTS

| 4,725,156 | 2/1988 | Proulx | 400/706 |
| 4,902,139 | 2/1990 | Adiutori | 374/137 |
| 4,903,139 | 2/1990 | Minter | 358/296 |
| 5,241,397 | 8/1993 | Yamada | 358/296 |
| 5,397,192 | 3/1995 | Khormaee | 400/708 |

FOREIGN PATENT DOCUMENTS

| 0477 872 A2 | 4/1992 | European Pat. Off. |  |
| 0621 721 A2 | 10/1994 | European Pat. Off. |  |
| 0224374 | 12/1984 | Japan | 400/104 |
| 0198271 | 10/1985 | Japan | 400/104 |
| 0270958 | 12/1991 | Japan | 400/105 |
| 0363266 | 12/1992 | Japan | 400/104 |

*Primary Examiner*—Christopher A. Bennett
*Attorney, Agent, or Firm*—Skjerven, Morrill, MacPherson, Franklin & Friel

[57] ABSTRACT

A duplex printing system and a printing method which enables printing of the second side of substrate in any desired order is provided. The printing system includes a printing unit, a reader and a processing unit. In the first pass, the printing unit receives a digital representation of a first image and at least one machine readable code and prints the first image and the machine readable code on a first side of a printing substrate. In the second pass, the reader identifies the printed machine readable code, preferably a bar-code, and provides it to the processing unit. The processing unit provides the digital representation of a second image associated with the machine readable code to the printing unit for printing a second image on a second side of the printing substrate, preferably, but not necessarily, in an orientation which is generally similar to the orientation of the printed first image and in registration therebetween.

20 Claims, 3 Drawing Sheets

APPARATUS AND METHOD FOR DUPLEX PRINTING

FIELD OF THE INVENTION

The present invention relates to duplex printing generally and more particularly to a system and method for employing a machine readable code for associating images printed during a first pass and a second pass on the same printing substrate.

BACKGROUND OF THE INVENTION

Systems and methods for printing on both sides of a substrate, such as paper, are known in the art. Printing on both sides of a substrate, also known as duplex printing, is a desirable feature of any printer since duplex printing reduces the amount of paper used.

Prior art systems for duplex printing can be classified into two categories. In one category, the printing mechanism is doubled so that the paper is printed either on both sides simultaneously or in a pipeline manner. A drawback of printers of this category is that they are expensive and therefore, they are usually only used for high speed printing.

In the second category, both sides are printed by the same printing unit. Therefore, there is a need to flip the paper after it had been printed on one side in order to print on its other side. The paper can be flipped manually by an operator or by any of the flipping mechanisms known in the art.

As is well known in the art, the image to be printed is represented as a digital image stored in the computer which controls the printer. The image may be a graphic image, a text or any combination thereof.

Since duplex printers with a single printing unit print on one side of a batch of substrates first, and then on the other side thereof, the images to be printed are stored in the computer in an order, typically in sequence. Therefore, the substrates must be fed into the printer in the same order in the second pass, i.e. when the second side of the substrates is printed, as in the first pass, i.e. when the first side of the substrates is printed.

A drawback of duplex printers with a single printing unit is that if the substrates to be printed are not fed in the same order in the first pass and in the second pass, the substrate will not include the correct image on its second side. Moreover, if the substrates are fed in a different orientation in the second pass than in the first pass, the image on the second side thereof will be in an undesired orientation.

Also, the positioning of the printed image on both sides of the substrate may be different, i.e. they are not in registration therebetween. However, it is often desired that the images on both sides of the printing substrate will be in registration therebetween.

SUMMARY OF THE INVENTION

The present invention seeks to provide a duplex printing system and a printing method which enables printing of the second side of substrate in any desired order.

The present inventor has realized that by printing a machine readable code in addition to the desired image on one side of a each substrate, the printing system may assign the correct image to be printed on the other side thereof, irrespective to and independent of the order in which the substrates are fed into the printing system.

Further, the present inventor has realized that by printing two machine readable codes in addition to the desired image on the first side of each substrate, the printing system may assign the image to be printed on the second side of the substrate in a correct orientation.

Still further, the present inventor has realized that by utilizing the machine readable code, the edge of the image and/or the edge of the printing substrate to measure distances in the direction of the printing substrate movement and in the direction generally perpendicular thereto, registration between the images printed on both sides of the printing substrate is achieved.

According to one aspect of the present invention, there is provided a method of duplex printing first information on one face of a sheet, and second information related to said first information on the opposite face of the sheet, comprising: feeding the sheet in a first pass through a printer which prints said first information on said one face of the sheet, and which also prints during said first pass: (a) a first machine-readable code at one end of the sheet, which code identifies one form of the second information to be printed on the opposite face of the sheet if the sheet is fed from said one end, and (b) a second machine-readable code at the opposite end of the sheet, which latter code identifies a second form of the second information to be printed on the opposite face of the sheet if the sheet is fed from the opposite end; and feeding the sheet in a second pass through a printer which reads the code at the leading end of the sheet so fed, and prints on said opposite face the form of the second information identified by said read code.

According to another aspect of the present invention, there is provided a method of duplex printing first information on one face of a sheet, and second information related to said first information on the opposite face of the sheet, comprising: feeding the sheet in a first pass through a printer which prints said first information on said one face of the sheet and which also prints on said sheet a machine-readable code which identifies the second information to be printed on the opposite face of the sheet; and feeding the sheet in a second pass through a printer which reads said code, controls the printing of the second information on the opposite side of the sheet in accordance with said read code, and utilizes a predetermined point on said machine-readable code as a reference point for effecting registration of the printing of said second information on said opposite side of the sheet.

According to a still further aspect of the present invention, there is provided apparatus for duplex printing first information on one face of a sheet, and second information related to said first information on the opposite face of the sheet, comprising: a printer for printing, in a first pass, said first information on said one face of the sheet, and which also prints during said first pass: (a) a first machine-readable code at one end of the sheet, which code identifies one form of the second information to be printed on the opposite face of the sheet if the sheet is fed from said one end, and (b) a second machine-readable code at the opposite end of the sheet, which latter code identifies a second form of the second information to be printed on the opposite face of the sheet if the sheet is fed from the opposite end; a feeder for feeding sheets into the printer; a reader for reading the code at the leading end of each sheet as it is fed into the printer; and a processor for controlling the printer, during a second pass of the sheet through the printer, to print on said opposite face of the sheet the form of the second information identified by the code read by the reader.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
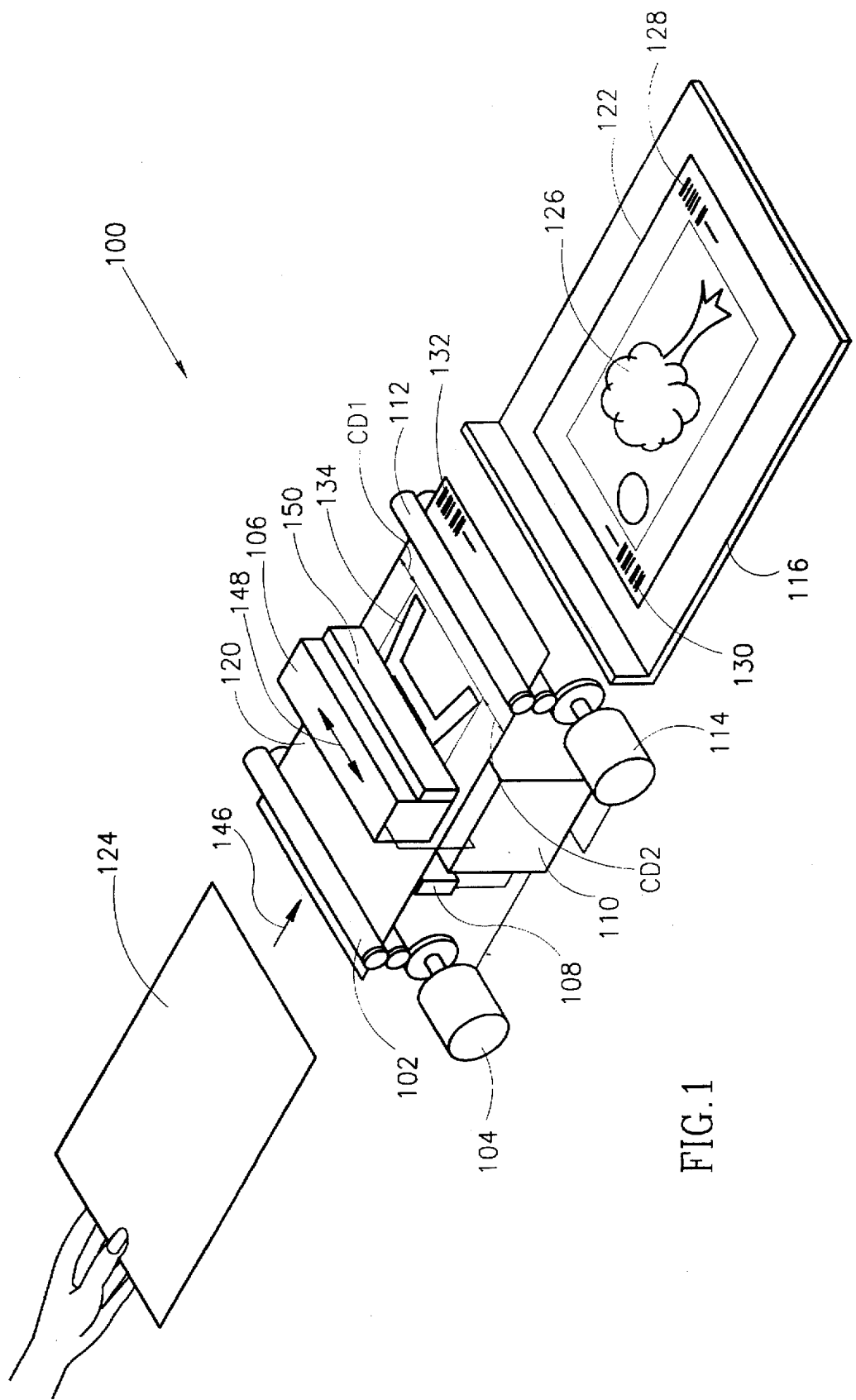
FIG. 1 is a schematic isometric illustration of a printing system, constructed and operative according to a preferred embodiment of the present invention, and in a first printing position.
Figure 2:
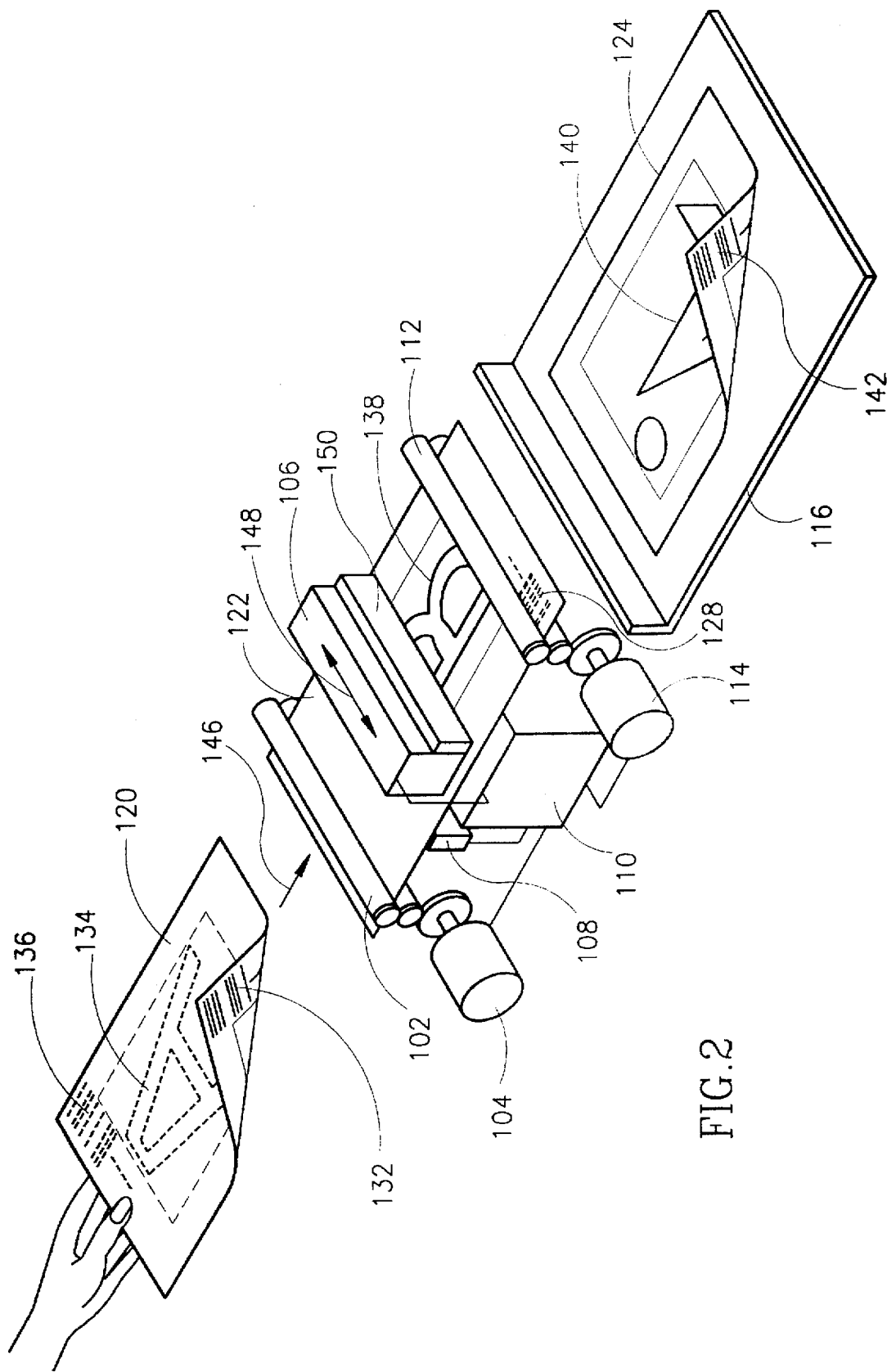
FIG. 2 is a schematic isometric illustration of the printing system of FIG. 1 in a second printing position.

Reference is now made to FIGS. 1 and 2 which are schematic illustrations of a printing system according to a preferred embodiment of the present invention. The printing system, generally referenced 100, may be any duplex printing system, such as an ink-jet printing system. An example of an inkjet printing system is the commercially available Scitex Outboard printer which is a large format continuous ink-jet printer used for billboard printing.

The printing system 100 preferably comprises any feed-in mechanism, such as rollers 102 operated by a motor 104, for feeding substrates in the form of sheets to be printed into a printing position, a printing head 106 for printing an image and a machine readable code, such as a bar-code, on one side of the printed substrate, a code reader, such as a bar-code reader 108, for identifying the printed machine readable code, a Central Processing Unit (CPU) 110 for controlling the operation of the printing system 100, a memory (not shown) for storing the digital representations of the images to be printed and a list of numeric codes which represent machine readable codes, such as bar-codes.

It will be appreciated that the printing system 100 may include more than one printing head. It may, for example, include the printing head 106 for printing the image and an additional printing head for printing the machine readable code. It will also be appreciated that the printing head may be any suitable printing head, such as a moving printing head capable of moving in the direction indicated by arrow 148.

The system 100 also preferably comprises a feed-out mechanism, such as rollers 112 operated by a motor 114, and a collector 116 for collecting the printed substrates after printing.

For exemplary purposes only, and as a non-limiting embodiment the printing system 100 will be described with respect to sheets of paper such as the three different sheets indicated by reference numerals 120, 122 and 124, respectively. It will be appreciated that the printing system 100 may be fed with any suitable substrate to be printed, such as paper or plastic, in any suitable form, such as a continuous roll of paper, and in any format.

The printing system 100 prints on the second side of each one of the sheets 120, 122 and 124, the correct image irrespective of the order by which they are fed into the printing system 100. As illustrated in the drawings, in FIG. 1 the sheet 122 is shown in the collecting system after one side thereof has been printed, the sheet 120 is shown in a printing position and the sheet 124 is shown before it is fed into the printing system 100. In FIG. 2, the sheet 124 is shown in the collection system 116 after its second side has been printed, the sheet 122 is shown in a printing position of its second side, and the sheet 120 is shown before it is fed into the printing system 100 for printing the second side thereof.

According to one preferred embodiment of the present invention, the images are stored in the memory such that each pair of images which are to be printed on the same sheet are associated with a numeric code of a printed bar-code. In the first pass, the printing head 106 prints a different image and a different bar-code on each one of the sheets 120, 122 and 124. In the second pass, the bar-code reader 108 identifies the bar-code printed on the first side of each sheet that is being fed into the printing system 100, and in accordance therewith the correct image for printing is retrieved from the memory by the CPU 110.

According to another preferred embodiment, two bar-codes of two different numeric codes are assigned to each pair of images. For example, bar-codes 128 and 130 are printed on two opposite ends of the sheet 122 (FIG. 1). In the second pass, the bar-code reader 108 identifies only the first bar-code of the two bar-codes according to the direction by which the sheet is fed to the printing unit. Since the position of the two bar codes in respect to the printed image on the first side is known, the CPU 110 can provide the correct image to be printed on the second side in the correct orientation. For example, if the sheet 122 is fed in the second pass with the edge of the bar-code 130 first, the CPU will rotate the image such that the images on both sides of the sheet 122 will be printed with the same orientation.

Reference is now made specifically to FIG. 1 which schematically illustrates the printing system 100 in a first pass. Preferably, each one of the sheets 120, 122 and 124 is fed into the printing system 100 using the feeding mechanism 102 as shown for the sheet 120. Then, as shown for the sheet 120, the printing head 106 prints an image 134 and the bar-code 132 assigned thereto. Then, the printed sheet is fed-out to the collector 116 by the feed-out mechanism 112. The sheet 122 is shown with an image 126 and two bar-codes, 128 and 130 in the collector 116.

Reference is now made specifically to FIG. 2 which schematically illustrates the printing system 100 in a second pass. As indicated hereinabove, the sheets 120, 122 and 124 may be printed in the second pass in a different order than that in which they were printed in the first pass.

In the second pass, the bar-code reader 108 identifies the bar-code printed on the first side of a sheet after it is fed into the printing system 100 and before it is printed. Preferably, the printing head 106 and the bar-code reader 108 are located on opposites sides of the sheet since the bar-code is on the opposite side of the side to be printed in the second pass.

The sheet 120 is shown before it is fed into the printing system and therefore it carries only the image 134 and the bar-codes 132 and 136 printed thereon in the first pass.

For the sheet 122, which is in a printing position of its second side, the bar-code 128 (shown in dotted lines in FIG. 2) is identified by the bar-code reader 108. In accordance therewith the CPU 110 retrieves the image to be printed and provides it to the printing head 106 which prints an image 138. It will be appreciated that since the bar-code 128 has been identified, the printing system will ignore the bar-code 130 (not shown in FIG. 2).

The sheet 124 is shown in the collector 116 after an image 140 was printed thereon and after the bar-code 142 was identified by the bar-code reader 108 when the sheet 124 was in a printing position.

It will be appreciated that once a bar-code is identified, the numeric code associated therewith is provided to the CPU 110, which, in turn, retrieves from the memory the correct image. Moreover, if the image is not in a correct orientation, the CPU 110 rotates the image and provides it to the printing head 106 in the correct orientation.

A preferred method for printing with the printing system 100 preferably includes the following steps:

A. assigning a numeric code of a specific bar-codes (preferably two numeric codes of two bar-codes) to each of two images which are to be printed from two opposite sides of the same sheet;

B. feeding to the printing system 100 a sheet to be printed;

C. printing a first image to be printed on one side of the fed sheet and in addition thereto printing the bar-codes assigned to the printed image, preferably along the sheets margins;

D. repeating steps B and C for a desired number of sheets;

E. collecting the printed sheets and flipping them;

F. feeding the flipped sheets in any order into the printing system;

G. identifying the first bar-code which the bar-code reader recognizes; if no code is detected then the sheet to be printed is rolled out from the printing system;

H. retrieving the image associated with the numeric code of the read bar-code in a correct orientation and providing it to the printing head.

I. printing the retrieved image: and

J. repeating steps F-I for a desired number of sheets, thereby printing on both sides of a desired number of sheets.

Figure 3:
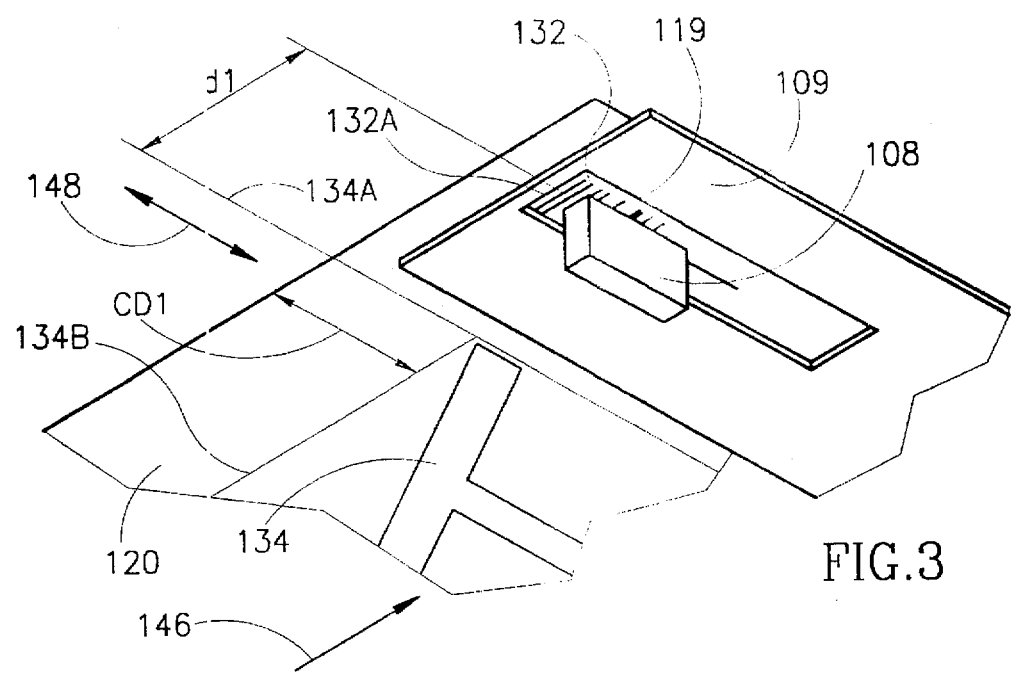
FIG. 3 is a schematic isometric illustration of the bar code reader identifying a bar code according to yet another preferred embodiment of the present invention.
Figure 4:
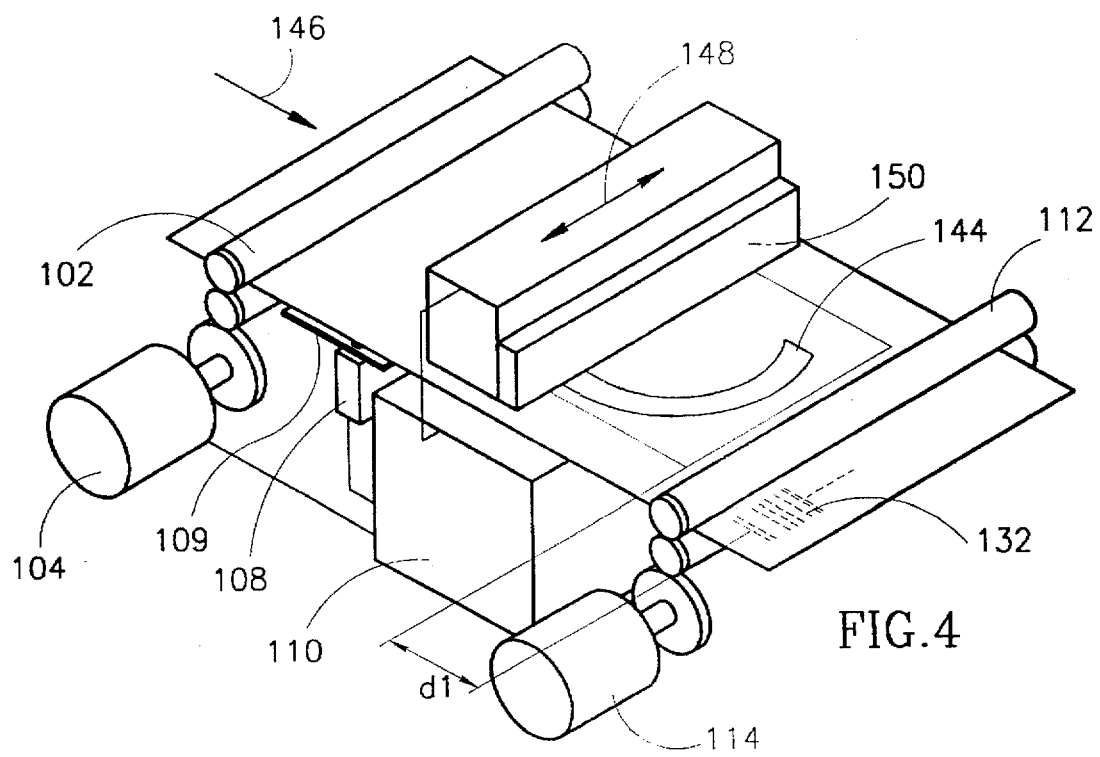
FIG. 4 is a schematic isometric illustration of part of the printing system of FIGS. 1 and 2 in a printing position after the bar code reader identifies the bar code as illustrated in FIG. 3.

Reference is now made to FIGS. 3 and 4 which illustrate a preferred method for providing registration between the images printed on the first and second sides of the printing substrate. The registration method of the present invention provides registration between the images printed on the first and second side of the printing substrate in the order of hundreds of microns. The method of the present invention is particularly useful for large format printouts, such as the ones produced by the aforementioned Scitex Outboard printer.

The registration method of the present invention utilize the machine readable code, the edge of the image and the edge of the printing substrate to determine distances in the first pass so as to locate the image printed in the second pass in registration with the image printed in the first pass.

Registration in the printing substrate movement direction 146 is provided as follows. In the first pass, the processing unit 110 sets and records the distance, denoted d1 between a reference point 132a of the bar code 132 and the edge 134a of the image 134, denoted by the rectangle that corresponds to the image data stored by processing unit 110.

In the second pass, the bar-code reader 108 detects the reference point 132a within the bar code 132. In the illustrated embodiment, the sheet 120 with bar code 132 is shown in the second pass from below (FIG. 3) where bar-code reader 108 identifies the single line representing edge 134a of the image 134, which is generally parallel with the cross direction 148. This reference line 134a is identified when the sheet 120 moves in direction 146 so as to expose the bar code 132 through a slit 119 in a plate 109 separating the bar-code reader 108 from the sheet 120.

Once the reference location of the bar code 132 is identified by reader 108, an indication to that effect is provided to the processing unit 110. The processing unit 110 retrieves the distance d1 recorded in the first pass and determines in accordance therewith, the edge of the image 144 for the second side. Once the edge of the image 144 is reached the printing head 106 start printing the image 144 on the second side of sheet 120 as shown in FIG. 4.

Registration in the direction perpendicular to direction of movement 146 of the sheet 120, i.e. the cross direction indicated by arrow 148 is provided as follows. In the first pass, the distances from the edges of the image 134 to the edge of the sheet 120 denoted by cd1 and cd2 (FIG. 1) are set and stored by the processing unit 110. It will be appreciated that only one distance may actually be stored since cd1 sets cd2 for the sheet 120 and vice versa.

It will also be appreciated that since the processing unit stores the data of the image 134, the exact location of the image 134 is also stored and therefore only the edge of the sheet 120 has to be determine in order to measure the distance therebetween. According to a preferred embodiment of the present invention, an electro-optical detector 150 which forms part of or attached to the printing head 106 detects the edge of the sheet 120 and provides an indication of same to the processing unit 110 which determines in accordance therewith the distances cd1 and cd2.

In the second pass, the detector 150 is employed to detect the edge and to provide and indication thereof to the processing unit 110 which retrieves one of the distances cd1 or cd2 and determines in accordance therewith the edge of the image 144 is the cross direction 148.

It will be appreciated that the registration method has been described hereinabove with respect to registration in the directions 146 and 148 separately for simplicity of illustration only and that all the operations with respect to both directions are done in the first pass and second pass, so as to provide registration in both directions generally simultaneously.

It will be appreciated that the preferred embodiments described hereinabove are described by way of example only and that numerous modifications thereto, all of which fall within the scope of the present invention, exist. For example, the machine readable code may be any suitable invisible code, such as an Infra-Red (IR) sensitive bar-code, or a magnetic code. Since the IR bar-code is not visible to the human eye the printed sheet appears without any additional markings thereon. Another example is to employ any suitable reader, such as an Optical Character Recognition (OCR) reader and to employ an appropriate printed code.

Another example is that the printing system 100 enables to print on the second side of a printed substrate which is a roll only the images which correspond to images successfully printed on the first side as follows. According to this modification, the second code is not printed on the first side when an image is not successfully printed. Since the roll is fed in a reverse order in the second pass than that of the second pass, the reader expects to encounter the code which was printed second in the first pass for each image first. If the second code is not encountered, the CPU does not retrieve the image to be printed on the second side of this portion of the roll.

An additional examples is that the machine readable code may be printed with different printing unit that the printing unit for printing the images. For example, if the machine readable code is a IR sensitive code its printing unit may by a different printing unit than the one which prints the image. The two printing units may be positioned on the same side of the printed substrate or on opposite sides thereof. Accordingly, the reader will be on the opposite side of the code printing unit.

It will be appreciated by persons skilled in the art that the present invention is not limited to what has been particularly shown and described hereinabove. Rather, the scope of the present invention is defined only by the claims that follow:

We claim:

1. A method of duplex printing first information on one face of a sheet, and second information related to said first information on the opposite face of the sheet, comprising:
   feeding the sheet in a first pass through a printer which prints said first information on said one face of the sheet, and which also prints during said first pass:
   (a) a first machine-readable code at one end of the sheet, said first machine-readable code identifying one form of the second information to be printed on the opposite face of the sheet if the sheet is fed from said one end, and
   (b) a second machine-readable code at the opposite end of the sheet, said second machine-readable code identifying a second form of the second information to be printed on the opposite face of the sheet if the sheet is fed from the opposite end;
   and feeding the sheet in a second pass through a printer which reads the code at the leading end of the sheet so fed, and prints on said opposite face the form of the second information identified by said read code.

2. The method according to claim 1, wherein a plurality of said sheets are fed in said first pass, and then said plurality of sheets are fed through said second pass.

3. The method according to claim 1, wherein said first information and said second information are stored in a digital storage device and are extracted therefrom during said first and second passes, respectively.

4. The method according to claim 3, wherein said second information is stored in said one form in the digital storage device, said second information being extracted from said digital storage device in said one form and printed in said one form when said first code is read during the second pass, and being rotated to said second form and printed in said second form when said second code is read during said second pass.

5. The method according to claim 1, wherein said first information and said second information are printed on said first and second faces of the sheet by an ink-jet printer.

6. The method according to claim 1, wherein said second information is printed on said opposite face of the sheet in registration with the first information printed on said one face of the sheet; and wherein said registration is effected by utilizing a predetermined point on at least one of said machine-readable codes printed in said first pass as a reference point to control the printing during said second pass.

7. The method according to claim 6, wherein said registration is effected by measuring, during the first pass, a distance between said predetermined point of said one machine-readable code and the respective end of the space to be occupied by said first information to be printed on said one face of the sheet, and utilizing said measured distance to control the printing of said second information on said opposite face of the sheet.

8. The method according to claim 7, wherein said registration effected by utilizing the machine-readable code is vertical registration.

9. The method according to claim 8, wherein horizontal registration is also effected, by measuring, during the first pass, a horizontal distance between the opposite sides of the sheet and the respective sides of the space to be occupied by said first information to be printed on said one face of the sheet, and utilizing said measured distances to control the printing of said second information on said opposite face of the sheet.

10. A method of duplex printing first information on one face of a sheet, and second information related to said first information on the opposite face of the sheet, comprising:
    feeding the sheet in a first pass through a printer which prints said first information on said one face of the sheet and which also prints on said sheet a machine-readable code which identifies the second information to be printed on the opposite face of the sheet;
    feeding the sheet in a second pass through a printer which reads said code, controls the printing of the second information on the opposite side of the sheet in accordance with said read code, and utilizes a predetermined point on said machine-readable code as a reference point for effecting registration of the printing of said second information on said opposite side of the sheet.

11. The method according to claim 10, wherein said registration is effected by measuring, during the first pass, a distance between said predetermined point of said machine-readable code and the respective end of the space to be occupied by said first information to be printed on said one face of the sheet, and utilizing said measured distance to control the printing to said second information on said opposite face of the sheet.

12. The method according to claim 11, wherein said registration effected by utilizing the machine-readable code is vertical registration.

13. The method according to claim 12, wherein horizontal registration is also effected, by measuring, during the first pass, a horizontal distance between the opposite sides of the sheet and the respective sides of the space to be occupied by said first information to be printed on said one face of the sheet, and utilizing said measured distances to control the printing of said second information on said opposite face of the sheet.

14. The method according to claim 10, wherein said first information and said second information are printed on said first and second faces of the sheet by an ink-jet printer.

15. Apparatus for duplex printing first information on one face of a sheet, and second information related to said first information on the opposite face of the sheet, comprising:
    a printer for printing, in a first pass, said first information on said one face of the sheet, and which also prints during said first pass:
    (a) a first machine-readable code at one end of the sheet, said first machine-readable code identifying one form of the second information to be printed on the opposite face of the sheet if the sheet is fed from said one end, and
    (b) a second machine-readable code at the opposite end of the sheet, said second machine-readable code identifying a second form of the second information to be printed on the opposite face of the sheet if the sheet is fed from the opposite end;
    a feeder for feeding sheets into the printer;
    a reader for reading the code at the leading end of each sheet as it is fed into the printer;
    and a processor for controlling the printer, during a second pass of the sheet through the printer, to print on said opposite face of the sheet the form of the second information identified by the code read by the reader.

16. The apparatus according to claim 15, wherein said processor includes a digital storage device for storing said first information and said second information, and for extracting said first information and said second information during said first and second passes, respectively.

17. The apparatus according to claim 16, wherein said digital storage device stores said second information in said one form, and said processor extracts said second information from said digital storage device for printing in said one form when said first code is read during the second pass, and rotates said second information extracted from said digital storage device to said second form for printing in said second form when said second code is read during the second pass.

18. The apparatus according to claim 15, wherein said processor also utilizes a predetermined point in said machine readable code as a reference point for effecting registration of the printing of said second information on said opposite face of the sheet during said second pass.

19. The apparatus according to claim 18, wherein said processor effects said registration by measuring, during said first pass, a distance between said predetermined point of said machine-readable code and the respective end of the space to be occupied by said first information to be printed on said one face of the sheet, and controlling the printing of said second information on said opposite face of the sheet in accordance with said measured distance.

20. The apparatus according to claim 15, wherein said printer is an ink-jet printer.

* * * * *